United States Patent [19]

Gehring et al.

[11] 3,770,610

[45] Nov. 6, 1973

[54] TOOL FOR MECHANICALLY AND ELECTROCHEMICALLY MACHINING THE SURFACE OF METALLIC WORKPIECES

[75] Inventors: Christoph W. Gehring, Nellingen; Egbert Scholz, Hannover; Wolfgang Strauss, Nurtingen, all of Germany

[73] Assignee: Maschinenfabrik Gehring K.G., Nellingen, Germany

[22] Filed: Nov. 2, 1971

[21] Appl. No.: 195,071

[30] Foreign Application Priority Data
Nov. 26, 1970 Germany .................. P 20 58 114.0

[52] U.S. Cl. ........ 204/217, 204/129.46, 204/224 M, 204/280, 204/286
[51] Int. Cl. .......................... B23p 1/14, B23p 1/04
[58] Field of Search ................. 204/143 M, 224 M, 204/217, 280, 129.35, 129.46, 224 M, 280, 217, 286

[56] References Cited
UNITED STATES PATENTS

| | | | |
|---|---|---|---|
| 3,267,018 | 8/1966 | Greening | 204/143 G |
| 3,506,558 | 4/1970 | Nagel et al. | 204/143 G |
| 3,390,068 | 6/1968 | Ellis et al. | 204/143 G |
| 3,616,289 | 10/1971 | Ellis | 204/143 G |
| 3,405,049 | 10/1968 | Czubak | 204/143 G |

Primary Examiner—F. C. Edmundson
Attorney—Walter Becker

[57] ABSTRACT

A tool for mechanically and electrochemically machining the surfaces of metallic workpieces in which a cylindrical body has distributed thereabout in alternating relation mechanical tool elements and electrochemical tool elements. The tool elements are radially moveable on the body and respective actuators are provided therefor with a slip clutch between the actuators so that when the electrochemical tool elements stop on the workpiece surface, the mechanical elements can continue radially outward feed movement.

33 Claims, 3 Drawing Figures

PATENTED NOV 6 1973 3,770,610
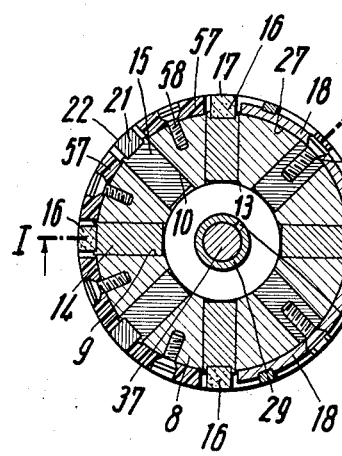
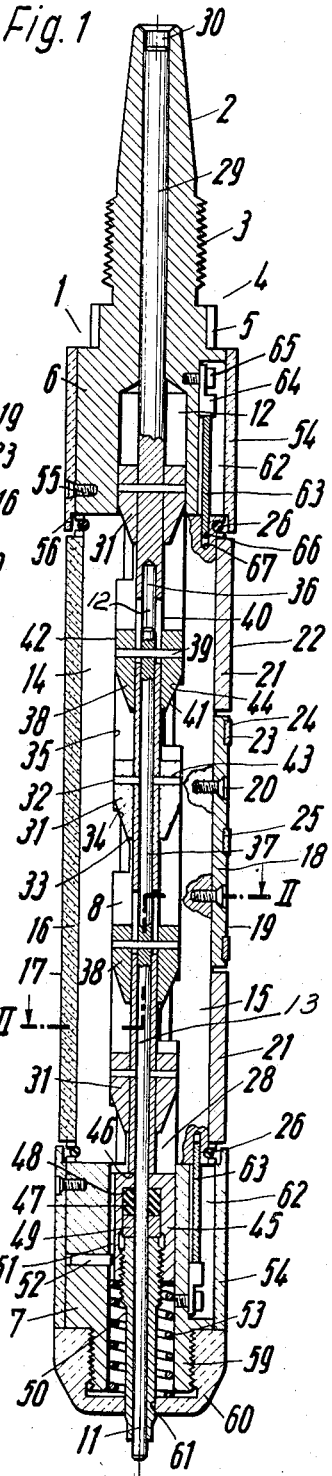
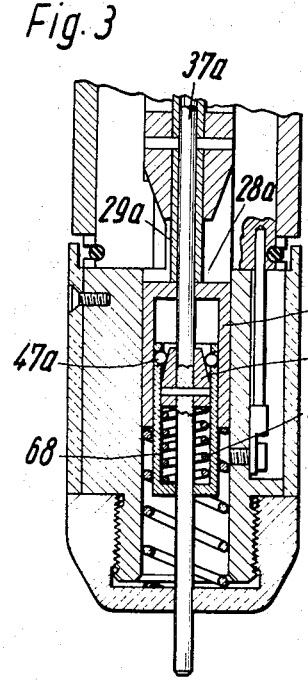

TOOL FOR MECHANICALLY AND ELECTROCHEMICALLY MACHINING THE SURFACE OF METALLIC WORKPIECES

The present invention relates to a tool for mechanically and electrochemically machining the surface of metallic workpieces which tool has an electrolytical and a mechanical working surface adapted to act in a honing manner and respectively arranged on separate tool elements which are arranged on a tool body and are adapted to be fed in a direction transverse to the working surfaces by different amounts.

With an electrochemical honing process, material is electrochemically taken off from the bore wall of the workpiece arranged as anode, and the surface of the workpiece is freed from a possibly existing passive layer and planed by the simultaneously engaged honing stones. The electrochemical material removal is in conformity with Faraday's law $$M = (1/96,500)(A/n) \cdot I \cdot t$$

proportional to the charge Q, i.e. proportional to the current I and time $t$. For the current I Ohm's law reads $$I = u/R$$

in which R stands for the resistance offered by the electrolyte stroke in the gap between the workpiece surface and the cathode surface to be machined, in other words of the electrolytically effective working surface. From these given interrelations, there results the tendency to work with as narrow gaps as possible of the size of from 0.05 to 0.5 millimeters in order to obtain a maximum of precision and material removal.

With surfaces which have to be machined with honing additions of more than 0.5 millimeters with regard to the diameter, therefore, the method of employing the honing broaching body itself as cathode or to use separate cathode segments fixedly connected to the honing broaching body, is no longer suitable.

When the electrodes or cathode segments are automatically fed, for instance, by springs or centrifugal forces, the great advantage is obtained that major form errors of the workpieces, for instance, with regard to oval shape, conical shape, or the like, can no longer be eliminated inasmuch as the individual electrodes move in conformity with the undesired form of the machining surface.

It is, therefore, an object of the present invention to provide a tool of the above mentioned general type which is so designed that in spite of a simple construction, it will assure a precise setting of the electrolytically effective working surface.

This object and other objects and advantages of the invention will appear more clearly from the following specification, in connection with the accompanying drawing, in which:

FIG. 1 illustrates a section through a honing tool according to the present invention, said section being taken along the line I—I of FIG. 2.

FIG. 2 is a section taken along the line II—II of FIG. 1, but on a larger scale than the latter.

FIG. 3 shows the front end of a further embodiment of a honing tool, and more specifically, represents an axial section similar to that of FIG. 1.

The tool for mechanically and electrochemically surface machining of metallic workpieces with an electrolytically and a mechanical working surface, especially a working surface operating in a honing manner, which working surfaces are respectively arranged on separate tool elements which are mounted on a tool body and adapted to be fed transverse to the working surfaces by different amounts is, in conformity with the present invention, characterized primarily in that the electrolytically effective tool element is, in its respective set working position, secured with regard to movements in feeding direction. The electrolytically effective tool element will, in this way, not allow a changing course of the maching surface so that, for instance, when a bore is to be machined, a precisely cylindrical machining surface will be obtained.

According to a further feature of the invention, the electrolytically effective tool element is, in its moving direction, under spring load, supported with a counter surface by a setting surface of the pertaining feeding device while the tool element preferably opposite to the feeding direction is, by a spring load which is greater than the occurring centrifugal forces, supported by the setting surface, so that in a simple manner, an aligning of the tool element can be effected.

For actuating the feeding device in a simple manner, the setting surface is adjustable substantially in the direction of the tool axis while the setting surface and/or the counter surface are inclined to the axis of the tool so that by an axial movement of the setting surface a radial movement of the electrolytically effective tool element will be created.

In particular, in order to cause the setting surface to engage the counter surfaces of all electrolytically effective tool elements distributed over the circumference, the setting surface is at least partially conical whereby it will be assured that it can, for avoiding a unilateral wear, be rotated relative to the tool body. For purposes of obtaining an extremely precise uniform feed of the electrolytically effective tool element over the entire axial extension thereof, a plurality of setting surfaces, preferably at uniform distances, are serially arranged in the axial direction of the tool.

When the setting surface and/or the counter surface extend in the direction toward the tool end which faces away from the clamping end, at an incline away from the working surface, the actuating bar may, in a simpler manner than from the connecting end of the workpiece, be arranged, for instance, as a pressure bar operable by a bar in the machine spindle, which pressure bar does not have to be connected to the bar in the machine spindle by separate coupling elements.

For purposes of further simplifying the construction of the tool, the setting surface is provided on a sleeve-shaped or similar setting element which is connected to the actuating bar, preferably by means of at least one radial pin.

In order to make sure that the electrolytically effective working elements are, in each instance, safely guided and aligned, the setting element, preferably in its moving direction pertaining to the feeding direction comprises directly behind the setting surface a guiding surface for the arrangement along a running surface of the tool body, said guiding surface preferably being formed by a cylinder mantle. The counter surface associated with the setting surface may, in a simple manner, be provided on that edge of the tool element which faces away from the working surface.

For a safe mount, the electrolytically effective tool element is, by means of a preferably strip-shaped sliding element mounted in guiding means which are advantageously formed by an axial slot of the tool body.

In order to obtain a large electrolytically effective working surface, said working surface is mantle segment-shaped and preferably is formed by a circular ring segment which, for purposes of an easy assembly of the tool is connected to the sliding element. Expediently, that inner surface of the mantle segment which faces away from the working surface is, for purposes of self-stabilization, for the whole surface arrangement arranged on the circumference of the tool body so that, in completely returned condition it is supported safely and can hardly be damaged by outer mechanical influences. The said mantle segment is preferably arranged symmetrically with regard to the axial plane of the tool, which axial plane passes through the sliding element.

It is particularly advantageous to arrange a plurality of electrolytically effective working surfaces, especially in even number, uniformly around the axis of the tool, preferably between each two mechanically effective working surfaces so that when viewing in circumferential direction, mechanically and electrolytically working surfaces alternate, and a high material removal can be obtained.

For purposes of obtaining an always constant working gap, i.e. an always constant distance between the electrolytically effective working surface and the workpiece surface being machined, the electrolytically effective tool element has at least a spacer member which protrudes beyond the pertaining working surface and which preferably consists of electrolytically non-conductive material for the arrangement on the surface to be machined. The extent to which the spacer member protrudes beyond the electrolytically effective working surface determines the width of the working gap which may amount, for instance, to from 0.05 to 0.5 millimeters.

For purposes of obtaining a very stable movement of the tool and to realize a uniform gap over the entire extension of the electrolytically effective working surface, there is provided a plurality of spacer members in the direction of the tool axis and/or in the direction of the circumference on and distributed over the electrolytically effective working element. Preferably, a plurality of spacer members are, each time, aligned in one of the two directions, especially in the direction of the tool axis. However, it is also advantageous to provide exclusive or additionally, spacer members in the direction of the tool axis adjacent to the electrolytically effective working surface, because in such an instance, a guiding will also be assured when the cathode surfaces prior to the reversal of the stroke of the tool completely leave the bore to be machined.

The spacer member which preferably is fastened in a recess, for instance, by an adhesive may be formed by a precious stone, for instance, a ruby ball, a sapphire, a diamond, or the like, by an aluminum oxide ceramic plate, a plate of synthetic or other material which is electrically non-conductive. The material is expediently so selected that the spacer member will have good sliding properties.

The tool according to the invention may also be designed for machining of surfaces by means of very small diameter, when the feeding device is provided in the tool body and preferably comprises an actuating bar in the axis of the tool.

According to a further suggestion in conformity with the invention, there is provided at least one annular spring which extends around the tool axis and which engages all electrolytically effective tool elements. By means of said annular spring, the electrolytically effective tool elements are, in response to a corresponding movement of their setting surfaces moved into their returned position. However, it is also possible to load the electrolytically effective working elements in feeding direction with at least one spring.

For purposes of obtaining a safe and simple feeding, there is in the power path of the feeding device provided a friction coupling, especially a friction clutch, which is adjustable with regard to the follower resistor, so that in response to an actuation of the feeding device, the spacer elements will, at a predetermined pressure, be pressed against the workpiece surface being machined. Thereupon, in response to a further actuation of the feeding device, a slip will occur in the friction clutch means, as a result of which a still stronger pressing on the spacer elements will be prevented. The said coupling means may be of a mechanical, hydraulic, pneumatic, electric, or magnetic design.

According to a particularly advantageous embodiment of the invention, the coupling part on the actuating side of the friction clutch is provided with a control device for at least one tool element which is adjustable transverse to the working surface and is mounted on the tool body. Preferably, such connection is a positive connection. The tool element has the mechanically effective working surface so that in response to an actuation of the adjusting or control device, the mechanically effective tool element can be fed at will by a frictional engagement, whereas the electrolytically effective tool element will follow this feeding movement through the friction clutch only until in the described manner the spacer members are at a predetermined pressure, pressed against the workpiece surface being machined. This is particularly advantageous, inasmuch as the mechanically effective tool elements in the course of the machining of the workpiece surface are worn to a considerably greater extend than spacer members so that the mechanically effective tool elements have to be fed by greater distance than the electrolytically effective tool elements.

According to another embodiment of the invention which is highly advantageous, the adjusting device has at least one setting surface which is adjustable in the direction of the tool axis and engages a counter surface of the mechanically effective tool element. At least one of these two surfaces lies, in conformity with the setting surface and/or the counter surface of the feeding device for the electrolytically effective tool element, at an incline to the tool axis. A particularly favorable construction is obtained when in the axial direction of the tool, alternately a setting surface for the mechanical and a setting surface for the electrolytically effective tool element is provided so that both tool elements, with reference to the axial direction of the tool, are uniformly supported by the setting surfaces. Inasmuch as the mechanically effective tool element is, during the machining exposed to a higher load than the electrolytically effective working element, it is expedient to provide one setting surface more for the mechanically effective tool than for the electrolytically effective working element so that there is obtained, for instance, an even number of setting surfaces for the electrolytically effective tool element and an odd number of setting surfaces for the mechanically effective tool element.

According to a particularly simple embodiment of the invention the setting device is substantially of the same construction as the feeding device.

Particularly in this instance, the actuating bars of the feeding device and of the setting or control device can safely be mounted one within the other, preferably in a space saving and telescopic manner. In particular, the actuating bar for the feeding device should lie on the inside and its respective setting member should by a pin, or the like, extending through at least an axial slot of the outer actuating bar, be connected to the inner actuating bar so that the setting elements of the setting device and of the feeding device can be moved relative to each other in the direction of the tool.

For purposes of obtaining a space saving construction, the clutch according to the invention is provided with a clutch sleeve, or the like, which is at least in the feeding direction, positively connected with an actuating bar, especially the actuating bar of the adjusting device. The friction element of the clutch rests against the clutch sleeve. Expediently, the friction clutch element is formed by a friction sleeve arranged in the clutch sleeve. The friction sleeve surrounds the actuating bar of the feeding device in a frictional engagement therewith.

In order to set the follower resistance of the clutch, the tool according to the present invention may preferably be equipped with an axially movable clamping member for the frictional member of the clutch. This clamping member may be formed preferably by a spindle sleeve which is guided in an inner thread of the clutch sleeve having an outer thread, said spindle sleeve surrounding the actuating bar of the feeding device and is operable from the outside of the tool while assuring a precise setting.

According to another embodiment of the invention, the frictional element of the friction clutch is formed by at least one clamping body, especially a roller blocking ring, the clamping bodies of which rest against a cone, or the like, located within the clutch sleeve and connected to the actuating bar of the feeding device. For purposes of obtaining a precisely predetermined follower force of the friction clutch, the clamping body and the cone, or the like, are for the mutual follower position spring loaded in particular by a pressure spring which rests against the major end face of the cone, or the like, on one hand and an end face of a cage for the clamping body on the other side. By changing the preload of the spring, it is possible to vary the follower force of the friction clutch.

In order to make sure that for actuation of the feeding and setting device, the actuating bar has to be actuated in one direction only, for instance, by the bar in the machine spindle, the actuating bar is, in a direction counter to the feeding direction, spring loaded, preferably by a pressure spring on the end face of the clutch sleeve.

If the friction clutch is in axial direction located adjacent to that section of the tool which comprises the working surfaces, preferably is located on that end which faces away from the clamping end of the tool, the friction clutch may be arranged in a simple manner also when the tool has a very small diameter.

For purposes of obtaining a particularly favorable relationship between the mechanical and electrolytical material removal, the electrolytically effective working surface extends in the axial direction of the tool over a, for instance, less than half the portion of the axial extension of the mechanically effective working surface. The electrolytically effective working surface is preferably located symmetrically with regard to the center of the axial extension of the mechanically effective working surface. As a result thereof, it is possible in a simple manner in the axial direction of the tool and adjacent to the electrolytically effective working surface to provide at least one guiding and/or spacer member. The guiding surface of said guiding and/or spacing member is preferably located in the continuation of the sliding surface of the spacer member which is provided within the range of the electrolytically effective working surface so that during the machining operation the spacer members as well as the guiding members engage the surface being machined and on one hand determines the width of the working gap and on the other hand contribute to stabilizing and aligning the tool relative to the surface being machined.

For purposes of obtaining a very high guiding precision, the guiding element is formed by a strip, the guiding surface of which, is constant as to the width, of the mechanically effective working surface. The guiding elements which consist in particular of electrically non-conductive material may in a simple manner be connected directly to the pertaining sliding member, preferably in a recess.

For further improvement of the guiding means of the tool, in axial direction on both sides of the electrolytically effective working surface, guiding and/or spacing members are provided. These guiding and/or spacing members have those ends thereof which face away from the electrolytically effective working surface extend in axial direction as far as the pertaining ends of the mechanically effective working surface. Espediently, the guiding end or spacer member is symmetrically arranged with regard to the central plane passing through the tool axis and pertaining to the respective electrolytically effective tool element whereby the guiding of the tool is further improved.

In order to avoid undesired electrochemical removal of material of material which removal might negatively affect the obtainable geometry of the workpiece surface to be machined, to tool body is, with the exception of the working surfaces and guiding surfaces, covered substantially completely with an electrical insulation connected thereto. This insulation is preferably formed by insulating sleeves which preferably in the axial direction of the tool are adjacent to both sides of the working surfaces, and is further formed by insulating sleeve segments located between the guiding surfaces and the mechanically effective working surfaces, and is furthermore formed by an insulating cap arranged at that end of the tool body which faces away from the clamping end of the tool. For simplifying the setting of the tool, the actuating bar of the feeding device and/or the clamping member of the friction clutch freely protrude beyond that end of the tool which faces away from the clamping end and preferably is guided by a bore in the insulating cap.

The insulating sleeves may in a simple manner be so designed that they extend over the two annular springs adjacent to the axial ends of the working surfaces.

In order to obtain a particularly loss-free current conduction to the electrolytically effective working surface, the pertaining tool element is connected to at least one highly flexible electric conductor, especially a copper strand. Expediently, the electric conductor is on one hand, connected to the sliding element of the electrolytically effective tool element which consists of an electrically good conductor as, for instance, brass, and on the other hand is connected to the electrically conductive tool body so that the electric conductor can be designed very short. Moreover, in this way, it will be assured that without affecting the electrically conductive connection, the tool elements forming the electrolytically effective working surface can be exchanged. According to a particularly advantageous embodiment of the invention, the pertaining end of the electric conductor which for purposes of obtaining an easy movability extends approximately parallel to the axis of the tool is inserted into a bore at the end of the electrolytically effective tool element and is preferably soldered thereto. The electric conductor outside the tool element extends in particular in an axial groove of the tool body which is covered by the pertaining insulating sleeve, so that the electric conductor in no way impedes the movability of the electrolytically effective tool element.

For connecting the tool through a connecting tool or directly to a machine spindle, the end of the tool body which is clamped in and preferably is formed by a clamping cone has an electric contact surface, as a result of which a large contact surface is obtained. This contact surface practically permits a loss-free transfer of high electric currents to the tool body. In particular, adjacent to the contact surface there is provided a trapezoidal thread, or the like, for clamping the tool fast.

Referring now to the drawings in detail, FIGS. 1 and 2 show a honing tool according to the invention which is equipped with a tool body 1 formed by a rotatable part. The tool body 1 has its rear end provided with a clamping cone 2, for instance, of the self-locking type, and is furthermore provided with an adjacent trapezoidal thread section 3 and with a collar 4 which in axial direction follows the thread section 3. The collar 4 has axial grooves 5 for tightening and loosening the tool.

The tool body 1 adjacent to the collar 4 and at the front end has a substantially cylindrical section 6, 7 respectively. These sections 6, 7 have the same diameter, and therebetween there is provided a substantially cylindrical central section which has a diameter reduced over that of the sections 6, 7. The central section 8 of the tool body 1 has axial slots which are uniformly distributed over the circumference. In this specific instance shown, there are provided eight substantially identical axial slots 9, 10 which are offset with regard to each other by 45°. Co-axially with the tool axis 11 there is provided in the tool body 1 a bore 12. The central portion 8 of bore 12 comprises a section 13 which is substantially cylindrical. The axial slots 9, 10 extend to the inner surface of said section 13.

Strip-shaped sliding members 14, 15 of substantially the same structure are, in a play-free manner, radially displaceably inserted into axial slots 9, 10. The sliding members 14, 15 extend over the entire length of the central section 8 and are in axial direction substantially in a play-free manner provided between those end faces of the sections 6, 7 which face each other. The height of the sliding strips 14, 15 substantially corresponds to the thickness of the wall of the central section 8 of the tool body.

Arranged on the radial outer edges of the sliding strips 14, 15 there are provided honing stones 16 for forming mechanically effective working surface section 17, and annular ring segments 18 for forming electrolytically effective working surface section 19. The arrangement is such that in circumferential direction between each two mechanically effective working surfaces 17 provided on the sliding strips 14, there is arranged on a sliding strip 15 an electrolytically effective working surface 19. The mechanically effective working surfaces 17 are forming narrow strips, whereas the electrolytically effective working surfaces 19 extend over an arc angle of approximately 90° each. The annular ring cathode segments 18, however, are so designed that their side edges are located just outside the stroke of movement of the adjacent sliding strips 14 provided with honing stones 16 so that said cathode segments 18 do not impede said sliding strips 14 with regard to their sliding movement. The strip-shaped honing stones 16 which extend approximately over the entire axial extension of the central section 8 of the tool body may, for instance, in an adherent manner be connected with the pertaining sliding strip 14. On the other hand, the cathode segments 18 which, similar to the honing stone 16, are respectively symmetrically arranged to the pertaining sliding strip are connected to the respectively pertaining sliding strip 15 by means of screws 20 which in axial direction are arranged one behind the other. The screw heads are countersunk so that they are located deeper than the electrolytically effective working surface 19. Thus, the cathode segments 18 can be disengaged from the pertaining sliding strips 15 and can thus be exchanged. The axial extension of the cathode segments 18 is less than half the actual extension of the honing stones 16. However, the arrangement is such that the entire electrolytically effective working surface 19 is considerably greater than the entire mechanically effective working surface 17. The cathode segments 18 are located symmetrically with regard to the center of the length of the central section 8 of the tool body or of the honing stones 16 which in axial direction adjacent to each cathode segment 18 on both sides there is one guiding strip 21 each connected to the pertaining sliding strip 16, for instance, by means of adhesion. The guiding strips 21 which in cross section corresponding approximately to the cross section of the honing stone 16 protrude with their guiding surfaces 22 by approximately 0.05 to 0.5 millimeters beyond the cylinder mantle formed by the electrolytical working surface 19 and are arranged symmetrically with regard to the axial plane of the tool which passes through the respective pertaining sliding strip 15. The guiding strips 21 extend in the axial direction of the tool in slightly spaced relationship to the respective pertaining cathode segment 18 and with those ends thereof which face away from said cathode segments extend in axial direction of the tool as far as the honing stone 16. Aside from the guiding and spacer strips 21, guiding and spacer elements 23 are connected directly to the cathode segments 18. The sliding surfaces 24 of said elements 23 are located in the cylinder mantle in which the guiding surfaces 20 of the guiding strip 21 are provided. The spacer members 23 are, for instance, by adhesive means connected to corresponding recesses 25 in the electrolytically effective working surface 19 and are located symmetrically with regard to the plane of symmetry of the pertaining electrolytically effective working surface 19 extending through the tool axis and are also symmetrically located with regard to the longitudinal central plane of the pertaining electrolytically effective working surface 19, which longitudinal central plane extends at a right angle with regard to the tool axis. The guiding as well as the spacer strips 21 and also the guiding and spacer strips 23 consist of electrically non-conductive material with good sliding properties.

At the ends of the sliding strips 14, 15 there are respectively provides annular springs 26 formed, for instance, by a rubber ring and surrounding all sliding strips. These springs 26 are arranged in circumferential grooves of the tool body 1 and also in grooves of the sliding strips 14, 15 which last mentioned grooves are in alignment with said first mentioned grooves so that the sliding strips 14, 15 are at both ends radially inwardly loaded by springs 26, the cathode segments 18 have their inner surfaces 27 which are as to their curvature adapted to the outer circumference, in completely returned condition placed against the circumference of the central section 8 of the workpiece body.

Provided in bore 12 of the workpiece body 1 is a control or adjusting device for the honing stone 16 and a feeding device for the cathode segments 18. These two devices are connected to each other by a friction clutch 28 in the front end section 7 of the workpiece body 1.

The adjusting device for the honing stone 16 comprises an actuating bar 29 which is located in the tool axis and is displaceably mounted in axial direction. Actuating bar 29 is accessible through a section 30 of the bore 12 which section is located in the clamping cone 2 and in the thread section 3 as well as in the collar 4, but has its pertaining end completely located inside the tool body 1. Mounted onto the actuating bar 29 are three conical control members 31 which, in the specific illustrated embodiment, are formed by two sleeves which are respectively connected by two radial pins 32 but, if desired, may also form one piece with the actuating bar 29. Each control member 31 has a front conical section 33 with mantle lines converging toward the front tool end and with a rear cylindrical section 43. The adjusting elements 31 are arranged at equal distances substantially in the area of the central section 8 of the workpiece body. The control surface 33 of each control element 31 engages the counter surfaces 34 of all sliding strips 14 distributed over the circumference. The said counter surfaces 34 extend at an incline with regard to the axis of the tool. These counter surfaces 34 are provided on the radially inwardly located edges of the sliding strips 14. By means of sections 43, the control members 31 are guided in the bore section 13.

When the actuating bar 29 is displaced relative to the tool body 1 in the direction toward the front tool end, the sliding strips 14 are, by means of the control surfaces 33 of the adjusting members 31, pressed outwardly against the thrust of springs 26 in such a way that the working diameter of the honing stones 16 is correspondingly increased.

In a bore 36 which is located in the front and substantially in that end of the actuating bar 29 which is located in the central section 8 of the tool body, there is displaceably mounted a further actuating bar 37 of the feeding device for the cathode segments 18, for displacement in the axial direction of the tool. This actuating bar 37 is connected to the actuating bar 29 through the friction clutch 28. Between two adjacent control elements 31 each of the adjusting devices for the honing stones 26, there is displaceably mounted on the actuating bar 29 a control member 38 of the feeding device for the cathode segments 18. This control element 38 is so displaceably mounted that in the present instance two such control elements 38 are provided. These control elements 38 are respectively, by means of a diametrical pin 39 extending through two axial slots 40 in the mantle of the outer actuating bar 29, positively connected to the inner actuating bar 37. As a result thereof, the control elements 38 are adapted to be moved in axial direction relative to the control elements 31. The control elements 38 are substantially of the same design as the control elements 31 which means that they have a front cone-shaped section 41 and a rear cylindrical section 42. The diameter and the angle of the cone 41 equal the diameter and the angle of the cone 33, whereas the outer diameter of the cylindrical section 42 equals that of the cylindrical section 43. As a result thereof, also the control elements 38 are guided in the bore section 13. The sliding strips 15 have at their inner edges inclined edge sections 44 which correspond to the sliding strips 14 and by means of which they engage the conical surfaces 41 of the control elements 38 of the feeding device so that as a result of axial movement of the actuating bar 37 in the direction toward the front tool end, the cathode segments 16 are moved radially outwardly whereby the working diameter of the electrolytically effective working surface is increased. When both actuating bars 29, 37 are adjusted simultaneously and to the same extent, the honing stones 16 and the cathode segments 18 carry out substantially identical radial movements.

Clutch 28 has a clutch sleeve 45 which is displaceable in the section of bore 12 which is provided in the front section 7 of the tool body 1. By means of this clutch sleeve 45 the actuating bar 37 is guided, whereas the actuating bar 29 by means of its annular end face 46 arranged on its front end engages the rear end face of the clutch sleeve 45 so that the clutch sleeve 45 will be taken along by the actuating bar 29 during a forward movement of the bar 29. In the bore of the clutch sleeve 45 which narrows down as to its inner diameter at the rear end thereof to the diameter of the actuating bar 37, there is provided a friction sleeve 47 which may consist, for instance, of rubber elastic material. Friction sleeve 47 has on one hand its rear end face resting against the inner end face 48 of the clutch sleeve 45, and has its front end face resting against a pressure ring 49 which is displaceably arranged in the sleeve bore. The front region of the clutch sleeve 45 has an inner thread having mounted therein a clamping spindle 50 with a corresponding thread section. By means of the clamping spindle 50, the friction sleeve 47 which surrounds the actuating bar 37 in a frictional connection may be tensioned or squeezed or relieved by the pressure ring 49 in such a way that the friction relative to the circumference of the actuating bar 37 is either increased or decreased. For purposes of preventing the coupling sleeve 45 from turning, a radial pin 52 provided in the front section 7 of the tool body engages an axial slot 51 arranged on the circumference of said clutch sleeve 45. A helical pressure spring 53 rests against the front end face of the clutch sleeve 45, said spring 53 being located in the bore 12 of the tool body. By means of this spring 53, the clutch sleeve 45 and thus the actuating bar 29 are spring urged toward the rear starting position.

When the actuating bar 29 is in the described manner displaced in the direction toward the front tool end, it takes along the actuating bar 37 in the same direction by means of the friction clutch 28 until the sliding surfaces 22, 24 of the guiding and spacer elements 21, 23 with such high surface pressure engage the workpiece surface to be machined that the force of clutch 28 which brings about this taking along will be overcome. If then, the mechanically effective working surfaces 17 of the honing stones 16 do not yet engage the workpiece surface to be machined, only the actuating bar 29 moves so that only the honing stones 16 are fed. In the course of the machining of the workpiece, the honing stones 16 wear considerably more than the guiding and/or spacer members 21, 23 so that by actuation of a single actuating bar only, namely, the actuating bar 29, the mechanically and electrolytically effective tool elements are fed in conformity with said different wear.

The tool body 1 is, for instance, by an insulation of synthetic material, completely covered from its rearward cylindrical section 6 to the front end with the exception of the working surfaces 17, 19 and the sliding surfaces 22, 24. This insulation comprises two sleeves 54 of synthetic material which are placed upon the cylindrical sections 6, 7 and are connected thereto by means of radial screws 55. The said two sleeves 54 have those end zones 56 thereof which face each other extend over the respective pertaining annular spring 26. The central section 8 of the tool body 1 is in the axial range of the guiding strips 21 covered up by sleeve segments 57 of synthetic material. These segments 57 are respectively located between a guiding strip 21 and the respective adjacent honing stone 16 and are connected to the tool body 1 by means of screws 58 which in axial direction are arranged one behind the other. The front end of the tool body 1 has an outer threaded section 59 which is reduced in diameter and on which has been screwed an insulating cap 60 by means of a corresponding inner thread, said insulating cap 60 consisting, for instance, of polypropylene. The end face of said cap 60 extends up to that end face of the front insulating sleeve 54 which faces said first mentioned front end face. The pot-shaped insulating cap 60 serves for supporting the front end of the helical pressure spring 53 and has a bore 61 through which extends from the tool into the opening the clamping spindle 50 as well as the front end of the actuating bar 37, which front end is journaled in said spindle 50. In this way, the clamping spindle 50 which has its front end, for instance, provided with key surfaces, is adapted from the outside of the tool and without difficulties to be turned for adjusting the follower force of the friction clutch 28. The cylindrical sections 6, 7 of the tool body 1 have axial slots 62 which are located symmetrically with regard to the sliding strips 15. These axial slots 62 are covered toward the outside by the respective pertaining insulating sleeve 54. Highly flexible copper strands 63 are arranged in said axial slot 62 and have one end provided with a cable shoe 64 which by means of a screw 65 is connected to the bottom of the pertaining axial slot 62, in other words to the tool body 1. The other end of the copper strand 63 which is substantially axis parallel to the tool is inserted into a bore 67 at the end side. This bore 67 is provided in the respective sliding strip 15 located in the same axial plane and is connected by soldering so that a highly satisfactory current conduction from the tool body 1 to the cathode segments 18 will be assured.

According to the embodiment illustrated in FIG. 3, a smaller sleeve 68 of a corresponding outer diameter is displaceably mounted in the coupling sleeve 45a of the friction clutch 28a. The rear open end of said sleeve 68 forms a cage for clamping balls 47a, which on one hand engage the inner surface of the coupling sleeve 45a, and on the other hand engage the conical surface of a cone 69. Cone 69 is, for instance, by means of a diametrical pin arranged on the actuating bar 37a of the feeding device for the electrolytically effective tool elements. The cage sleeve 68 and the cone 69 are spring urged toward each other by a helical pressure spring 49a which in its turn rests on one hand on cone 69 and on the other hand against the front annular-shaped end of sleeve 68 by means of which the actuating bar 37a is guided. By means of spring 49a, the clamping balls 47a are pulled toward the cone 69 and thereby are pressed radially outwardly against the inner surface of the coupling sleeve 45 a so that in response to an actuation of the actuating bar 29a of the adjusting device for the mechanically effective tool elements, the actuating bar 37a is frictionally taken along until the counter pressure acting upon the guiding and/or spacer elements becomes so high that the coupling sleeve 45a will by overcoming the clamping force of the clamping balls 47a be displaced relative to sleeve 68 and thereby relative to the actuating bar 37a.

By changing the preload of spring 49a, for instance, while employing one of the spindles corresponding to the clamping spindle 50, the carrying along force of the friction clutch 28a can likewise be varied.

The tool described above is suitable in particular for electrolytically honing of workpiece bores, especially long workpiece bores while the cathode surfaces 19 will, with each tool stroke, protrude entirely from the bore and the electrolyte feeding and discharging operation is effected through the workpiece clamping device.

It is, however, also possible that the cathode surfaces have at least the length of the workpiece bore and the lifting height as it is preferably advantageous for the machining of short workpiece bores. Furthermore, the honing tool may also be provided with an electrolyte feeding and discharging device, which device is provided in the honing tool. Furthermore, the design according to the invention may also be provided on a honing tool for the machining of outer surfaces.

It is, of course, to be understood that the present invention is, by no means, limited to the showing in the drawing, but also comprises any modifications within the scope of the appended claims.

What is claimed is:

1. Apparatus for mechanical and electrochemical machining surfaces of metallic workpieces, a tool body, first tool means provided with the tool body for mechanically machining a workpiece, second tool means provided with the tool body for electrochemically machining a workpiece, each of said first and second tool means having work surfaces, separate feed means adjustable by differing amounts and journalled by the body in location transverse to the work surfaces of said first and second tool means respectively, said second tool means being secured in a particular adjusted position by said feed means pertaining thereto to assure against movement in feeding direction and also against movement contra to feeding direction, clutch means positively effective for coupling said separate feed means together, and an actuator means of said feed means for said second tool means being connected on output side thereof with said clutch means.

2. Apparatus according to claim 1 in which work surface of said first tool means compared with work surface of said second tool means provides greater axially extending magnitude.

3. Apparatus according to claim 1 in which said clutch means includes adjustable coupling resistance provision.

4. Apparatus according to claim 1 in which said first and second tool means have counter surfaces, and actuating bar means provided with adjusting surfaces engaged by said counter surfaces and provided to be adjustable axially of the tool body, said actuating bar means being coupled together by said clutch means.

5. Apparatus according to claim 1 in which first adjusting surface means alternately in axial direction of the tool body being provided for said first tool means for mechanical machining and second adjusting surface means alternately in axial direction of the tool body being provided for said second tool means for electrochemically machining.

6. Apparatus according to claim 5 in which one adjusting surface means is provided more for said first tool means than for said second tool means.

7. Apparatus according to claim 1 in which annular spring means at least engages all movable tool means in common.

8. Apparatus according to claim 1 in which said feed means are located essentially entirely within the tool body and adjusting bars thereof directly adjoining each other.

9. Apparatus according to claim 8 in which said adjusting bars are located coaxially telescopic in said feed means.

10. Apparatus according to claim 8 in which internally located adjusting bars of said feed means for said second tool means and a sleeve formed control means thereof are connected together by at least one pin guided in an axial slit of an outer adjusting bar.

11. Apparatus according to claim 1 in which said feed means are essentially identically embodied.

12. Apparatus according to claim 1 in which said clutch means includes a coupling sleeve positively connected with an adjusting bar of said feed means of said first tool means at least in feeding-in direction of movement, and a force-locking member supported on said coupling sleeve.

13. Apparatus according to claim 12 in which said force-locking member comprises a friction sleeve arranged in said coupling sleeve and surrounding the adjusting bar of said feed means of said second tool means in force-locking connection.

14. Apparatus according to claim 12 in which a clamping spindle is provided for said force-locking member of said clutch means.

15. Apparatus according to claim 14 in which said clamping spindle comprises an externally actuated spindle sleeve surrounding an adjusting bar of said feed means of said second tool means, and guide means between said coupling sleeve and said spindle sleeve.

16. Apparatus according to claim 12 in which said force-locking member comprises at least one clamping body supported by cone means located inside said coupling sleeve and connected with an adjusting bar of said feed means for said second tool means, said clamping body and said cone means being resiliently biased against each other into a coupling position.

17. Apparatus according to claim 1 in which an adjusting bar of said feed means of said second tool means is resiliently biased against feed-in direction of movement.

18. Apparatus according to claim 1 in which said clutch means is provided remote from clamping location of said tool body in axial direction adjacent to work surfaces pertaining thereto.

19. Apparatus according to claim 1 in which an adjusting bar of said feed means of said second tool means protrudes beyond an end of said tool body remote from the clamping end thereof.

20. Apparatus according to claim 19 in which said second tool means comprises at least one spacer member projecting over a pertaining work surface and including electrically insulating material to engage against the work surface, there being several spacer members distributed peripherally of said tool body on said second tool means.

21. Apparatus according to claim 20 in which said several spacer members are adhesively secured in recess-forming means.

22. Apparatus according to claim 20 in which at least one spacer member is provided in axial direction adjoining electrochemically effective work surface.

23. Apparatus according to claim 22 in which the electrochemically effective work surface extends only less than half axial distance of mechanically effective work surface and being located approximately symmetrical to middle of axial extension of mechanical work surface.

24. Apparatus according to claim 22 in which in axial direction of the tool body adjacent to the electrolytically effective work surface there is provided at least one spacer member having a guiding surface preferably located in the continuation of a guiding surface of the spacer member which is provided in the region of the electrolytically effective work surface, and a guiding element formed by a strip having a guiding surface which equals in width preferably the width of the mechanically effective work surface.

25. Apparatus according to claim 24 in which the guiding element in particular consists of electrically non-conductive material connected directly to a pertaining sliding member, preferably in a recess.

26. Apparatus according to claim 24 in which in the axial direction on both sides of the electrolytically effective work surface there are provided spacer members, which preferably by means of their ends which face away from the electrolytically effective work surface extend in axial direction as far as the pertaining ends of the mechanically effective work surface.

27. Apparatus according to claim 24 in which the spacer member is located symmetrically with regard to the central plane which passes through the axis of the tool and pertains to the respective pertaining electrochemically effective tool means.

28. Apparatus according to claim 27 in which the tool body with the exception of the areas of the work surfaces and as the case may be of the sliding surfaces is substantially completely covered by an electrical insulation connected thereto, which insulation is preferably formed by insulating sleeves in the direction of the tool axis, being adjacent on both sides to the work surfaces, said insulating sleeves being located between the guiding surfaces and the mechanically effective work surfaces, and an insulating cap at that end of the tool body which faces away from the clamping end of the tool means, the parts of the insulation being detachably connected.

29. Apparatus according to claim 28 in which an actuating bar of the feed means and optionally a clamping element of the clutch means freely protrude beyond that end of the tool means which faces away from the clamping end and preferably is guided by a bore in said insulating cap.

30. Apparatus according to claim 28 in which said insulating sleeves extend over two annular springs which are adjacent to the axial ends of the work surfaces.

31. Apparatus according to claim 24 in which said second tool means for current supply is connected directly with at least one highly flexible electric counductor connected to a sliding member of the pertaining electrochemically effective tool means, said sliding member consisting of electrically well-conductive material connected particularly to the electrically conductive tool body.

32. Apparatus according to claim 31 in which a pertaining end of the electric conductor is substantially parallel to the tool axis and is inserted into a bore provided at the end of the electrochemically effective tool means and extends outside the tool means, especially in an axial groove of the tool body, the axial groove being covered by the pertaining insulating sleeve.

33. Apparatus according to claim 32 in which a clamping end of the tool body has an electric contact surface formed by a clamping cone and adjacent to the contact surface there is provided a trapezoidal thread.

* * * * *